United States Patent

Donovan

[15] 3,702,963
[45] Nov. 14, 1972

[54] 2-TRANSISTOR SATURATING CORE HIGH-VOLTAGE INVERTER

[72] Inventor: Lawrence E. Donovan, Liverpool, N.Y.

[73] Assignee: General Electric Company

[22] Filed: Aug. 24, 1971

[21] Appl. No.: 174,479

[52] U.S. Cl....................321/2, 321/15, 321/45 R
[51] Int. Cl.............................................H02m 3/28
[58] Field of Search.....................................321/2, 45

[56] References Cited

UNITED STATES PATENTS

| | | | |
|---|---|---|---|
| 3,303,405 | 2/1967 | Schwarz | 321/2 |
| 3,596,165 | 7/1971 | Andrews | 321/2 |
| 3,582,754 | 6/1971 | Hoffman et al. | 321/2 X |

Primary Examiner—William M. Shoop, Jr.
Attorney—J. Wesley Haubner et al.

[57] ABSTRACT

A source of direct voltage of relatively high magnitude is connected to the input winding of a saturable core transformer via a first path including one transistor in series with a capacitor which is charged to one-half the source voltage. The capacitor and the input winding are interconnected by a second transistor which, when conducting applies the capacitor voltage to the input winding with a polarity opposite to that of the source voltage. The two transistors are so controlled that they conduct alternately, with their conducting states being reversed each time the transformer core saturates. A load circuit is energized from the voltage induced in an output winding of the transformer.

8 Claims, 1 Drawing Figure

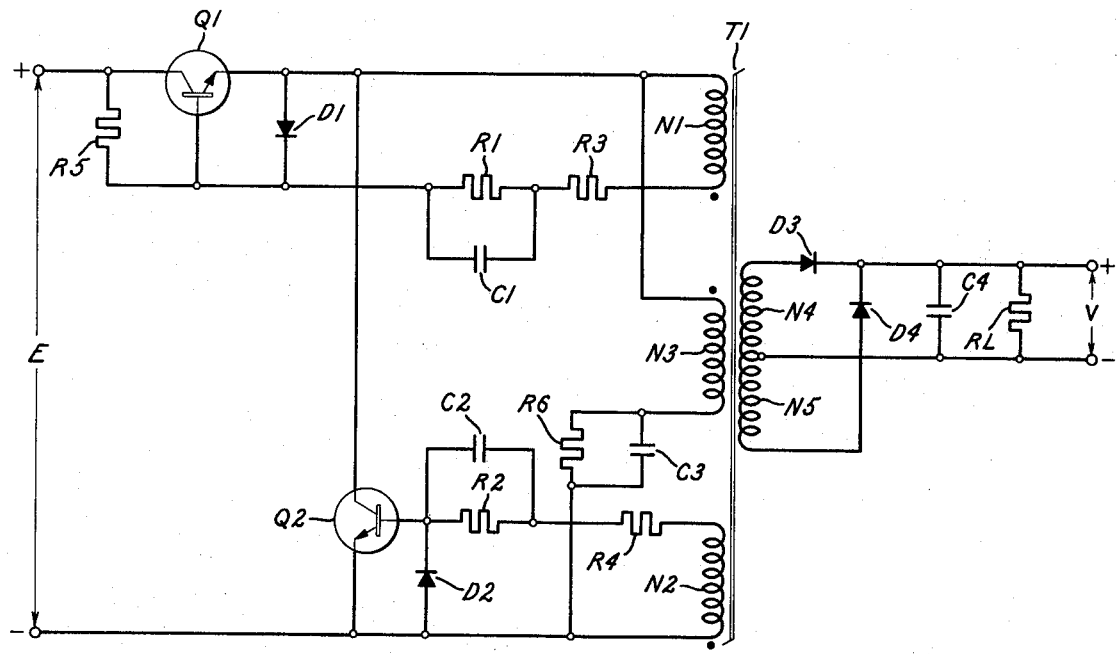

2-TRANSISTOR SATURATING CORE HIGH-VOLTAGE INVERTER

This invention relates generally to electric power converters, and more particularly it relates to such a converter utilizing one pair of transistors for converting direct voltage of relatively high magnitude to an output voltage of different form or magnitude.

The conversion of voltage from one form or magnitude to another is required in any applications such as voltage supplies and battery chargers. DC-to-DC converters typically employ switching or chopping circuits which may comprise oscillators, astable multivibrators, self excited inverters, or the like. A particularly advantageous circuit of this type is known as a 2-transistor saturating core inverter. As is well known to those skilled in the art, the transformer in such an inverter performs several useful functions: the timing of inverter operation (i.e., the frequency of the alternating voltage induced in the output winding of the transformer is determined by the frequency of saturation of its core); the control of the transistors (i.e., the base drives of the transistors are provided by voltages induced in auxiliary windings of the transformer); and electric isolation (i.e., the output winding is galvanically separated from the input winding). When operated at a high frequency (in the 10–50 KHz range), the 2-transistor saturating core inverter is a very stable, reliable, compact, and efficient circuit.

Most 2-transistor inverters require a transistor collector-to-emitter breakdown voltage rating of twice the input voltage. Consequently, such inverters cannot practically be used in relatively high voltage applications where the magnitude of the input voltage would be more than 50 percent the voltage rating of commercially available power transistors. It is the general objective of the present invention to provide an improved inverter of this kind having higher voltage capability, whereby the magnitude of the voltage applied to its input can be almost as great as the rating of the transistors.

In carrying out the invention in one form, a relatively high voltage, free running, 2-transistor inverter is formed by connecting a first winding of a saturable core transformer to a source of direct voltage via a first path which includes a first one of the transistors in series with a capacitor. When the first transistor is turned on, the first path conducts current from the source in a predetermined forward direction through the capacitor and the first winding which consequently effects magnetization of the transformer core in a predetermined sense. The first winding is also connected for energization from the aforesaid capacitor via a second path comprising the second transistor which is poled to conduct current, when turned on, in the reverse direction through the capacitor and the first winding, thereby effecting magnetization of the transformer core in the opposite sense. The on and off states of the two transistors are respectively controlled by voltages induced in auxiliary windings on the transformer core, these voltages having relatively opposite polarities so as to alternate the on states of the first and second transistors. An output winding of the transformer is adapted to be connected to a load circuit which is energized by the alternating voltage induced therein. In this arrangement, the voltage imposed on each of the two transistors will never exceed approximately 1.2 times the source voltage.

My invention will be better understood and its various objects and advantages will be more fully appreciated from the following description taken in conjunction with the accompanying drawing in which the single FIGURE is a schematic circuit diagram of a high input voltage converter embodying my invention.

As shown, the converter comprises a pair of DC input terminals, an inverting section, a rectifying section, and a pair of DC output terminals. The input terminals are adapted to be connected to a source of direct voltage E of relatively high magnitude. By way of example, if my inverter is equipped with General Electric type D44R power transistors, it can safely be used with input voltages up to 500 volts. Typically the source voltage E is derived from full-wave rectified sinusoidal line voltage of 110 or 220 volts RMS.

The inverting section of the converter includes a transformer T1 having a magnetizable core which is saturable. Inductively associated with this core are an input winding N3, an output winding having two halves N4 and N5, and a set of auxiliary windings N1 and N2. The input winding N3 is connected for energization by the source voltage E via a first path which includes the collector and emitter of a power transistor Q1 in series with a capacitor C3. The transistor Q1 has an off state in which it is substantially nonconductive between its collector and emitter and an on state in which it has relatively high conductivity. As will soon be apparent, the transistor Q1 is operated in a switching mode, with its on and off states being periodically changed or reversed. When Q1 is on, the first path will conduct current in a forward direction from the input terminals through the winding N3 and the capacitor C3. When so energized, the input winding N3 effects magnetization of the transformer core in a predetermined sense.

Another path, including the collector and emitter of a second power transistor Q2, connects the input winding N3 of the transformer T1 for energization from the capacitor C3. The transistor Q2 is a duplicate of transistor Q1. When it is on, the second path conducts current in the reverse direction through the capacitor C3 and the winding N3 which consequently effects magnetization of the transformer core in the opposite sense.

The inverter includes suitable control means for applying biasing signals of periodically reversing polarity to the base electrodes of the transistors Q1 and Q2, respectively. The arrangement is such that Q1 is turned on while Q2 is maintained in its off state and Q2 is turned on while Q1 is maintained in its off state. Preferably the control means comprises auxiliary windings N1 and N2 of the transformer T1 as shown.

The dot end of the winding N1 is connected to the base electrode of the transistor Q1 by way of a circuit comprising a series capacitor C1 shunted by a resistor R1, this parallel RC combination being connected in series with a damping resistor R3. The time constant of this base circuit should be much smaller than one-half the period of operation of the inverter so that C1 can perform its intended function of promoting abrupt and complete turn-off of Q1 at the end of each conducting interval. The voltage induced in the winding N1 is supplied between the emitter and base electrode of transistor Q1; when the dot end of this winding is relatively positive, Q1 is turned on, and when the polarity is reversed, Q1 is turned off. Thus the on and off states of Q1 are changed in response to the reversals of induced voltage in winding N1 on each occasion of saturation of the transformer core. The emitter and base electrode of the transistor Q1 are bridged by a diode D1 which is poled to conduct current and to maintain a reverse bias on Q1 so long as the dot end of N1 is relatively negative. The diode D1 is relatively slow, i.e., it has a relatively long reverse recovery time, thereby introducing a desirable slight delay in the turn-on action of Q1 at the beginning of each conducting interval. A resistor R5 of high resistance is connected between the collector and base electrode of transistor Q1.

The no dot end of the auxiliary winding N2 is connected to the base electrode of transistor Q2 via a circuit comprising a series capacitor C2 in parallel with a resistor R2 and in series with a damping resistor R4. A relatively slow diode D2 bridges the emitter and base electrode of Q2. The parameters and operation of the base circuit for Q2 are similar to those of Q1 previously described, except that the base drive that is provided by the voltage induced in winding N2 is relatively oppositely poled with respect to N1.

As noted above, the control means is effective in response to each saturation of the core of the transformer T1 to reverse the on/off states of the power transistors Q1 and Q2. Consequently there is induced in the output windings N4, N5 of the transformer a voltage which alternates at a frequency determined by the frequency of saturation of the core. The rectifying section of the illustrated converter changes the form of this voltage from alternating to direct, and the output of the converter is therefore a direct voltage V. As can be seen in the drawing, the rectifying section comprises a pair of diodes D3 and D4 connected between the opposite end terminals of the windings N4, N5 and the relatively positive output terminal, with the common ends of the same windings being connected directly to the relatively negative output terminal. A DC filter capacitor C4 is connected between the output terminals. The connected load is represented symbolically by a resistor $R_L$.

During normal operation of my inverter, the capacitor C3 is charged to one-half the input voltage E. Assume that transistor Q1 has just turned on. One-half the input voltage appears across winding N3 of the transformer T1. The induced voltage on the auxiliary winding N1 keeps Q1 on and in saturation until the transformer core saturates. The collector current of Q1 is limited by the reflected load impedance and the primary inductance of the transformer. When the transformer core saturates, the collector current rises to the product of the base current and the transistor current again, and Q1 then begins to pull out of saturation because of reduced base drive. This further reduces the voltage across the transformer windings and the base drive of Q1, and Q1 is consequently turned off. The decreasing current in N3 causes a polarity reversal of the voltages on all of the windings. The reversal of the induced voltage in the auxiliary winding N2 turns the power transistor Q2 on, whereupon the voltage across capacitor C3 is applied to the input winding N3 until the transformer core saturates in the opposite sense and the cycle repeats. Thus one-half the input voltage is applied to the winding N3 with alternating polarities as Q1 and Q2 alternately turn on.

If during one cycle the capacitor C3 were not charged to one-half E, a larger voltage would be applied to N3 when Q1 is on than when Q2 is on. This would result in more current flowing into the output DC filter during that portion of the cycle when Q1 is on. This imbalance in load current tends to charge up C3 until equal currents flow into the load during both half cycles, i.e., the voltage on C3 is one-half E. The load therefore tends to keep C3 charged to one-half the supply. Non-symmetrical operation may result if the load circuit were open.

To assure reliable stating, the resistor R5 should be small enough to raise the base of Q1 above the turn-on voltage of the transistor. A resistor R6 may be connected across the capacitor C3 to allow the voltage on this capacitor to decay when the inverter is turned off. This will allow C3 to discharge should it inadvertently get charged too high to enable the inverter to get started.

The breakdown voltage rating of the transistors Q1 and Q2 need be only 1.2 times the magnitude of the input voltage E. The transformer T1 isolates the load $R_L$ from the AC line to which the input terminals of the converter are connected. By varying the number of turns of the transformer output windings N4, N5, any voltage output can be obtained. Accordingly, the converter may be used for a low voltage unregulated supply or a low voltage battery charger. Because of the high frequency of operation, the circuit without the DC filter on the output may also be used in fluorescent lighting applications.

The core of the saturable transformer T1 should be characterized by a square loop material having low magnetization force and low power loss. The power transistors Q1 and Q2 should be selected to have adequate current, breakdown voltage, and power ratings and to have adequate ability to withstand second breakdown. In one embodiment that has been successfully tested, I use General Electric type D44R high voltage transistors. Other parameters of the circuit tested are set forth below by way of example.

| | |
|---|---|
| E | 180 volts DC |
| V (designed) | 90 volts |
| (actual) | 77.5 volts |
| frequency | |
| (designed) | 14 KHz |
| (actual) | 12.4 KHz |
| power out | 30 watts |
| efficiency | 82% |
| D1, D2 | General Electric type A14F |
| D3, D4 | General Electric type A114B |
| R1, R2 | 1,000 ohms |
| R3, R4 | 10 ohms |
| R5 | 250,000 ohms |
| R6 | 39,000 ohms |
| C1, C2 | 0.01 microfarads |
| C3 | 20 microfarads |
| C4 | 0.5 microfarads |
| N1, N2 | 5 turns |
| N3 | 50 turns |
| N4, N5 | 25 turns |
| $R_L$ | 200 ohms |

While I have shown and described a preferred form of my invention by way of example, many modifications will occur to those skilled in the art. I therefore intend by the concluding claims to cover all such modifications which fall within the true spirit and scope of my invention.

What I claim as new and desire to secure by Letters Patent of the United States is:

1. In combination
   a. a source of direct voltage;
   b. a magnetizable core having at least first and second windings inductively associated therewith;
   c. first and second switching means, each having an off state in which it is substantially nonconductive and an on state in which it has relatively high conductivity;
   d. a capacitor;
   e. means for connecting said second winding to a load circuit;
   f. a first unidirectionally conducting path connecting said first winding for energization from said source, said first path including said first switching means in series with said capacitor and being arranged when said first switching means is on to conduct current in a predetermined forward direction through said capacitor which is thereby charged to approximately one-half the source voltage and through said first winding which consequently effects magnetization of said core in a predetermined sense;
   g. a second unidirectionally conducting path connecting said first winding for energization from said capacitor, said second path including said second switching means and being arranged when said second switch means is on to conduct current in the reverse direction through said capacitor and said first winding which consequently effects magnetization of said core in the opposite sense; and
   h. control means for periodically changing the states to said switching means while said capacitor remains charged to approximately one-half the source voltage, said control means being effective during each cycle of operation:
      i. to turn on said first switching means while said second switching means is in its off state,
      ii. to turn off said first switching means and thereby lower said forward current to zero before any natural current zero thereof,
      iii. to turn on said second switching means while said first switching means is in its off state, and
      iv. to turn off said second switching means and thereby lower said reverse current to zero before any natural current zero thereof.

2. The combination set forth in claim 1 in which said magnetizable core is saturable.

3. The combination set forth in claim 2 in which said first and second switching means are transisters, each having a collector, emitter, and base electrode, the collector and emitter of the first transistor being included in said first path and the collector and emitter of the second transistor being included in said second path and in which said control means is effective to reverse the on states of said transistors in response to each saturation of said core.

4. The combination set forth in claim 3 in which said control means comprises means for applying biasing signals of periodically reversing polarity to the base electrodes of said transistors, the biasing signals for the respective transistors having relatively opposite polarities so as to alternate the on states of the first and second transistors.

5. The combination set forth in claim 4 in which said control means comprises third and fourth windings inductively associated with said saturable core, said control means further comprising a first base circuit interconnecting said third winding and the emitter and base electrode of the first transistor, and a second base circuit interconnecting said fourth winding and the emitter and base electrode of the second transistor, whereby the voltage induced in said third winding serves as the biasing signal for the first transistor and the voltage induced in said forth winding serves as the biasing signal for said second transistor.

6. The combination set forth in claim 5 in which said first base circuit includes a series capacitor shunted by a resistor and said second base circuit also includes a series capacitor shunted by a resistor.

7. The combination set forth in claim 5 in which the emitter and base electrodes of the first and second transistors are respectively bridged by slow diodes poled to conduct current when the associated transistor is biased off.

8. A 2-transistor saturating core inverter comprising:
   a. a source of direct voltage of relatively high magnitude;
   b. a saturable core transformer having first, second, third, and fourth windings;
   c. first and second transistors having collector, emitter, and base electrodes, each transistor having an off state in which it is substantially nonconductive between collector and emitter and an on state in which it has relatively high conductivity therebetween;
   d. a capacitor;
   e. means for connecting said second winding to a load circuit;
   f. a first path connecting said first winding for energization from said source, said first path including the collector and emitter of said first transistor in series with said capacitor and being arranged when said first transistor is on to conduct current in a predetermined forward direction through said capacitor and said first winding which consequently effects magnetization of the transformer core in a predetermined sense;
   g. second path connecting said first winding for energization from said capacitor, said second path including the collector and emitter of said second transistor and being arranged when said second transistor is on to conduct current in the reverse direction through said capacitor and said first winding which consequently effects magnetization of the transformer core in the opposite sense;
   h. a first base circuit interconnecting said third winding and the emitter and base electrode of said first transistor so as periodically to reverse the on and off states of the first transistor in response to the voltage induced in said third winding on each occurrence of saturation of the transformer core; and
   i. a second base circuit interconnecting said fourth winding and the emitter and base electrode of said second transistor so as periodically to reverse the on and off states of the second transistor in response to the voltage induced in said fourth winding on each occurrence of saturation of the transformer core, said second base circuit being poled relatively opposite to said first base circuit so that said second transistor is turned on while said first transistor is off and is off when said first transistor is turned on.

* * * * *